United States Patent
Birkenbach et al.

(10) Patent No.: US 6,807,897 B2
(45) Date of Patent: Oct. 26, 2004

(54) HYDRAULIC PISTON AND PROCESS FOR ITS SURFACE TREATMENT

(75) Inventors: Alfred Birkenbach, Hattersheim (DE); Rolf Weiler, Eppstein (DE); Uwe Zeibig, Achern (DE); Martina Wägner, Nürnberg (DE); Jan Elwart, Erftstadt (DE)

(73) Assignees: Bodycote Warmebehandlung GmbH, Ludenscheid (DE); Continental Teves AG & Co., oHG, Frankfurt (DE); Sander KG, Renchen-Ulm (DE)

( * ) Notice: Subject to any disclaimer, the term of this patent is extended or adjusted under 35 U.S.C. 154(b) by 315 days.

(21) Appl. No.: 10/024,113

(22) Filed: Dec. 18, 2001

(65) Prior Publication Data

US 2002/0104434 A1 Aug. 8, 2002

(30) Foreign Application Priority Data

Dec. 18, 2000 (DE) .......................... 100 62 431

(51) Int. Cl.⁷ .................................. F16J 1/04
(52) U.S. Cl. ..................... 92/223; 92/243; 148/217; 29/888.08
(58) Field of Search ................ 92/243, 223; 148/217; 29/888.08

(56) References Cited

U.S. PATENT DOCUMENTS 4,131,492 A * 12/1978 Fushimi et al. ............ 148/217
4,563,223 A * 1/1986 Dawes et al. ............... 148/217
4,702,779 A * 10/1987 Madsac et al. ............. 148/217
4,776,901 A * 10/1988 Heminghous ............... 148/217
4,918,806 A * 4/1990 Watanabe et al. ....... 29/888.048

FOREIGN PATENT DOCUMENTS

| DE | 19 59 393 | 4/1967 |
| DE | 32 06 432 | 9/1983 |
| DE | 41 39 975 | 6/1993 |
| DE | 44 43 036 | 6/1996 |

OTHER PUBLICATIONS

Search Report of the German Patent Office for Appln. 10062431.6.

* cited by examiner

Primary Examiner—Edward K. Look
Assistant Examiner—Igor Kershteyn
(74) Attorney, Agent, or Firm—Honigman, Miller, Schwartz and Cohn LLP

(57) ABSTRACT

The present invention relates to a hydraulic piston and a process for its surface treatment in order to improve above all the wear resistance and corrosion resistance at the surface of the piston. As a favorable manufacturing process for the surface treatment of an above-mentioned hydraulic piston, a multistage process is disclosed which arranges a nitrocarburization with a subsequent oxidation and a following mechanical solidification of the oxidized surface for the piston. As a result, several superposed layers—layer of oxide, connecting layer, diffusion layer—develop at the piston surface which exhibit the desired qualities.

6 Claims, No Drawings

HYDRAULIC PISTON AND PROCESS FOR ITS SURFACE TREATMENT

TECHNICAL FIELD

The present invention relates to a hydraulic piston and a process for its surface treatment in order to achieve desired properties with respect to wear resistance and corrosion resistance at the surface of the piston.

BACKGROUND OF THE INVENTION

Hydraulic pistons for use in hydraulic brake systems are e.g. known from the field of automotive vehicle brakes. The pistons exhibit a specially designed surface in order to satisfy requirements, above all, with respect to wear resistance and corrosion resistance. To safeguard these requirements, customary hydraulic brake pistons for application in friction brakes are frequently chrome-plated on their surface. Both the risk of detachment of the chrome-plating and the chrome-plating's lack in environmental friendliness is found to be a shortcoming. For other coating materials, too, there is the problem of insufficient adherence to the actual piston material so that the piston surface may easily be damaged. In addition, any coating applied will cause undesirable changes in the outside dimensions of the pistons.

DE 31 14 124 A1 further describes a piston for combustion engines which is made of aluminum and silicon and includes a hard oxidized bottom. Due to the employment of cost-intensive materials, the surface treatment of the bottom is also sophisticated, what makes the completed piston relatively expensive. An additional disadvantage can be seen in the fact that the piston has an improved surface quality only in partial areas. Thus, the corrosion resistance is not ensured for use of the piston as a hydraulic piston.

BRIEF SUMMARY OF THE INVENTION

Based on the above facts, an object of the present invention is to provide a hydraulic piston and a process for its manufacture wherein the piston shall exhibit a durable surface of high wear resistance and good corrosion resistance with no or only minor changes in its dimensions.

This object is achieved by a hydraulic piston according to the features of patent claim 1. Accordingly, the hydraulic piston, in particular the brake piston for an automotive vehicle brake, is furnished with a thermochemically treated surface which is formed of several superposed layers. Directly at the piston surface there is a continuous layer of oxide having a thickness of at least 1 $\mu$m. With a piston made of iron material, this layer consists of iron oxide and safeguards the corrosion resistance of the piston. It is important in this respect that the layer of oxide best covers the total surface of the piston and has no interruptions. A connecting layer that is mainly composed of nitrides is arranged beneath the layer of oxide and exhibits a very high degree of hardness, thereby providing the desired wear resistance at the piston surface. The nitrides develop in a thermochemical process for surface treatment wherein nitrogen is diffused into the piston surface. Below the connecting layer, the thermochemical treatment causes formation of a diffusion layer of low hardness which exhibits nitrogen in a dissolved condition or separated nitrides, respectively. The diffusion layer serves to increase the fatigue strength of the piston and has preferably a thickness of some tenths of millimeters. The connecting layer should have a minimum thickness of 8 $\mu$m to achieve the desired surface quality. In the practice, a thickness of the connecting layer of roughly 12 $\mu$m has proved favorable. Below the diffusion layer, as viewed from the piston surface, there is the original piston material, e.g. an iron material, steel, etc. Similar to the design made of an iron material, the piston may of course also be made of any other material, especially a metallic material.

An especially uniform and smooth piston surface is achieved in that the connecting layer prior to the oxidation includes capillary tubes or tube-like indentations which are respectively closed during the oxidation by the layer of oxide that develops at the piston surface. Principally, a large number of oxide nucleuses are produced due to the capillary tubes or indentations which intensifies the development of a homogeneous layer of oxide and, thus, improves corrosion protection. In addition, the individual capillary tubes or indentations are filled by the layer of oxide during the oxidation and, thus, closed at the piston surface by oxide particles or component parts of the layer of oxide so that a smooth surface is achieved.

As a favorable manufacturing process for the surface treatment of an above-mentioned hydraulic piston a multi-stage process is proposed which arranges a nitrocarburization process with a subsequent oxidation and a following machining treatment of the oxidized surface for the piston. Nitrocarburization in the gas phase, that means in a gaseous ambient medium, serves for the diffusion of nitrogen and carbon C into the piston material in order to provide the desired surface condition above all as far as wear resistance and corrosion resistance is concerned. In this operation, the outside dimensions of the piston are not influenced by the thermochemical treatment or only to a very small extent. In the nitrocarburization process, the piston undergoes a thermic cycle including a heating phase, a maintaining phase, and a cooling phase. This thermic cycle is performed by using a gas medium yielding nitrogen, preferably ammonia $NH_3$, and a gas medium yielding carbon C, especially carbon dioxide $CO_2$, endothermic atmosphere, exothermic atmosphere, methanol, etc. Further, additives such as e.g. nitrogen $N_2$ or hydrogen $H_2$ can be added to the gaseous ambient medium in order to intensify the thermochemical reaction at the piston surface.

To further improve the thermochemical surface treatment, the nitrocarburization of the hydraulic piston is carried out in several stages, including a first stage wherein the piston is exposed to a first gaseous medium comprised of ammonia $NH_3$, carbon dioxide $CO_2$, and nitrogen, and a second stage of nitrocarburization wherein the piston is exposed to a second gaseous medium comprised of ammonia $NH_3$ and carbon dioxide $CO_2$.

The objective of nitrocarburization is to have a positive effect on the piston surface in terms of its wear and fatigue strength by the diffusion of nitrogen and carbon C. A nitrocarburization coating which is composed of a connecting layer at the surface and a diffusion layer therebeneath is produced on the overall piston surface. The connecting and diffusion layers have the properties mentioned hereinabove. The minimum thickness of the connecting layer of 8 $\mu$m is adjusted by defined holding times at the process temperature stages. Besides, it is expedient to control the process parameters of nitrocarburization such as temperature variation, gas flow, and gas volume by microprocessors. The process result can be improved by limiting the temperature during the multistage nitrocarburization process to a maximum of 530° C. This prevents a change in the dimensions of the piston by deformation due to intensive thermal stress. In addition, the great loss in strain-hardening in the piston which occurs at high temperatures of thermal treatment is reduced. Thus, the strength of the piston in total can be increased at lower process temperatures.

In a preferred aspect of the process for surface treatment, an ambient medium separated from ammonia $NH_3$ is provided for the piston prior to the postoxidation in order to improve the results of the oxidation. It is necessary to develop a maximum large piston surface before the postoxidation to make available many oxide nucleuses. This is e.g. done by adjusting a defined piston temperature or a control of the cooling speed or of the gas composition after the nitrocarburization process. Further, a plasma stage (sputtering) can also be executed between nitrocarburization and postoxidation. The result of these measures is an enlarged piston surface, for example, due to the configuration of the above-mentioned capillary tubes or very small tube-like indentations. This facilitates the development of the layer of oxide which finally achieves a finer structure of the layer of oxide and, hence, ensures a better corrosion resistance. To provide an ambient medium that is separated from ammonia $NH_3$, the batch chamber accommodating the piston can be rinsed by nitrogen $N_2$ or any other inert gas, with a simultaneous reduction in temperature to below 480° C. Alternatively, an evacuation of the batch chamber with a subsequent flooding by nitrogen $N_2$ is advisable.

The actual oxidation takes place in a medium yielding oxygen, preferably air or steam. The desired thickness of the layer of oxide of at least 1 $\mu$m can be adjusted by appropriately controlling the oxidation time. A thickness of the layer of oxide of roughly 2 $\mu$m has proved favorable in practice.

To further improve the corrosion protection and the surface quality it is expedient to have the piston surface undergo machining after the oxidation. This measure will smoothen any roughness that might exist in the layer of oxide. The result will be an evenly smooth piston surface which especially has a low friction resistance. Machining of the layer of oxide may be achieved especially in a polishing operation. Brushing, finishing, paste-polishing, or lapping is advisable as machining processes. A brushing operation is especially advantageous because only little material is removed from the layer of oxide so that a continuous uninterrupted layer of oxide of a minimum thickness of 1 $\mu$m is maintained after machining.

Principally, the process for surface treatment described hereinabove is applicable not only to brake pistons but also to any other hydraulic piston, e.g. a brake actuation cylinder piston.

What is claimed is:

1. Hydraulic piston, in particular brake piston for an automotive vehicle brake, with a thermochemically treated surface, with several superposed layers at the piston surface, comprising:

fabricating a hydraulic piston, arranging at the hydraulic piston's surface a layer of oxide that has a thickness of at least 1 $\mu$m, arranging a connecting layer beneath the layer of oxide that is mainly composed of nitrides, arranging a diffusion layer beneath the connecting layer that includes nitrogen in a dissolved condition or separated nitrides, wherein the connecting layer has a minimum thickness of 8 $\mu$m.

2. Hydraulic piston as claimed in claim 1, wherein the connecting layer includes capillary tubes which are respectively closed at the piston surface by portions of the layer of oxide.

3. Process for surface treatment of a hydraulic piston, comprising the step of:

a nitrocarburization of the piston in a gaseous medium;

a postoxidation of the piston in a medium yielding oxygen $O_2$;

a machining of the oxidized surface for adjusting the surface quality, wherein the temperature during the nitrocarburization process amounts to maximally 530° C.

4. Process for surface treatment of a hydraulic piston as claimed in claim 3, wherein the nitrocarburization of the piston is carried out in several stages:

a first stage wherein the piston is exposed to a first gaseous medium including ammonia $NH_3$, carbon dioxide $CO_2$, and nitrogen, a second stage of nitrocarburization wherein the piston is exposed to a second gaseous medium including ammonia $NH_3$ and carbon dioxide $CO_2$.

5. Process for surface treatment of a hydraulic piston as claimed in claim 3, wherein an ambient medium separated from ammonia $NH_3$ is provided for the piston before the postoxidation.

6. Process for surface treatment of a hydraulic piston as claimed in claim 3, wherein said machining is effected by a polishing or brushing operation.

* * * * *